3,725,132
SOLID STATE THERMALLY ACTIVE BATTERY
James R. Moser, New Freedom, Pa., and Alan A. Schneider, Baltimore, Md., assignors to Catalyst Research Corporation, Baltimore, Md.
Filed Sept. 14, 1970, Ser. No. 71,765
Int. Cl. H01m 11/00
U.S. Cl. 136—90         3 Claims

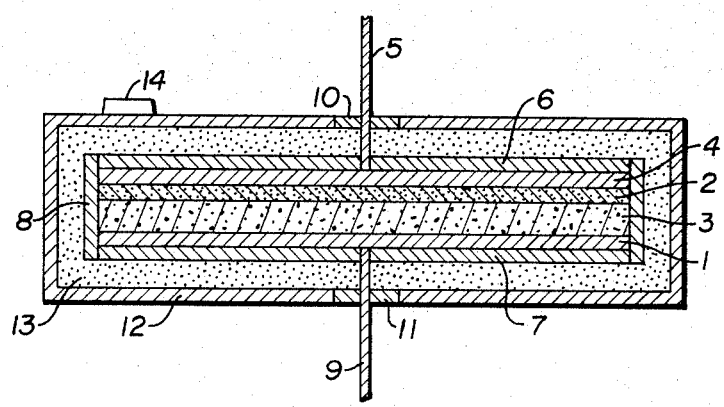

ABSTRACT OF THE DISCLOSURE

A solid state battery activated on heating, suitably by an integral combustible chemical charge, has a silver or copper anode, a depolarizer cathode and a solid salt electrolyte that is substantially non-conductive at normal ambient temperature but that becomes ionically conductive when heated.

---

This invention relates to a solid state thermally activated primary battery.

The conventional heat activated battery, commonly called a thermal battery, operates on the principle that fused salts are ionically conductive and will function as an electrolyte in a primary battery. Thermal batteries utilizing a salt electrolyte that is inert and non-conductive at normal temperatures are activated by heating to raise the battery temperature to the fusing point of the electrolyte. Thermal batteries are used in various ordnance applications that subject the batteries to high spin conditions. Fluid electrolyte batteries, even when the electrolyte is supported on solid carriers, are frequently subject to diminished or erratic performance under high spin because of electrolyte migration or secondary failures resulting from such migration, such as cell short circuiting.

It is accordingly an object of this invention to provide a heat activated battery having a solid electrolyte. A further objective is to provide a solid state heat activated battery having a solid electrolyte that exhibits a solid state phase change at an elevated temperature. Another object is to provide such a battery having an integral chemical heating source. Other objects will be apparent from the following description and claims, as well as the accompanying drawing which is a vertical section of a single cell battery in accordance with this invention.

Referring to the drawing, which shows a single cell battery greatly enlarged, a thin metallic anode 1 and a depolarizer cathode 2 are spaced by solid salt electrolyte 3. A thin conductive plate 4 of metal inert to the depolarizer, for example, nickel, serves as a current collector for connection of the depolarizer to the cathode lead 5. The cell is enclosed by insulating end plates 6 and 7 and ring 8, suitably formed of ceramic, asbestos or the like. The cathode lead and anode lead 9 extend through insulating bushings 10 and 11 in hermetically sealed housing 12, suitably formed of sheet metal. Within the housing is a combustible chemical charge 13 that burns without any substantial production of gas. A primer 14 is sealed in the housing for igniting the combustible charge. In operation of the cell, the primer is fired to ignite the combustible charge and the heat generated by the burning of the combustible charge heats the cell to a temperature at which it becomes functionally active. It will be recognized that the batteries may comprise any number of cells connected in series or parallel and that the arrangement of combustible material in the battery can be modified, the only requirement being that the heat is transferable to heat the cell. Series connected cells are conventionally formed by stacking cells directly against one another. When extremely fast activation is desired for a particular application, the combustible composition may be interlayered between cells to provide rapid heat transfer to each individual cell.

The batteries of this invention comprise a metallic anode, a solid electrolyte that undergoes a solid state phase transition from a high resistivity B-phase to high ionically conductive A-phase at an elevated temperature, a depolarizer cathode and means for heating the electrolyte to a temperature at which it is in the A-phase.

Silver and copper may be used as anodes in these cells, the selection depending primarily upon such factors as the power or potential required, and the particular depolarizer cathode used, as well as upon the operating temperature of the cell and the particular electrolyte used. It is generally preferred to use a silver anode. The anode may be in the form of a metal film, sheet or plates, or a compacted pellet of powdered metal. A preferred pellet anode is formed by compacting an intimate mixture of powdered metal and electrolyte, containing up to about 50% by weight electrolyte. Obtainable current densities from batteries having such preferred anodes are several times higher than those having anodes of powdered metal alone.

A variety of depolarizer cathodes comprising readily reducible oxidizing agents may be used, the selection depending primarily on the desired operating temperature of the cell, as well as the desired power output and potential. The depolarizer cathode generally also contains an electronically conductive material, preferably carbon, although inert metals can also be used. In some instances, improved current output is obtained if the depolarizer cathode also contains a minor amount of electrolyte. Among depolarizer cathodes found especially suitable for the batteries of this invention are iodine pentoxide ($I_2O_5$), vanadium pentoxide ($V_2O_5$) and bismuth triiodide ($BiI_3$). The activity of the depolarizer cathodes are dependent on temperature, so a depolarizer is preferably used that exhibits high activity at the cell operating temperature. Iodine pentoxide depolarizer cathodes are generally suitable for use above about 200° C. and below about 325° C., the temperature at which thermal decomposition occurs. Vanadium pentoxide is not sufficiently active for use below about 325° C., but can be used to advantage at higher temperatures, to about 530° C., or higher. Cell potentials using iodine pentoxide or vanadium pentoxide cathodes with silver anodes are about 0.4 to 0.6 volt. Bismuth iodide cathodes, although giving lower potentials on the order of 0.2 to 0.3 volt with a silver anode, are especially desirable for many applications because they can be used to advantage over a comparatively wide range of low temperatures, namely between about 250° C. and 420° C. Among other depolarizers having suitable activity at elevated operating temperatures, potassium dichromate ($K_2CrO_4$), tungstic oxide ($WO_3$), and manganese dioxide ($MnO_2$) have been found satisfactory for use with various metallic anodes.

The depolarizer cathode may be a compact of powdered material or applied to a metallic current collector or electron sink as a slurry or paste and dried to remove the slurrying liquid. Preferably, the cathode is an intimate mixture of powdered depolarizer and carbon, suitably containing between 1 and 6 parts by weight of carbon for each 10 parts of depolarizer. The carbon provides an electronically conductive path for the current generated by the cell to a lead or current collector used for making external connections to the cell. Other electronic conductive materials such as powdered inert metals may be used in place of carbon, if desired. The current output of cells can be further increased by incorporating a minor amount of cell electrolyte in the cathode, suitably 1 to 3 parts per 10 parts of depolarizer. Preferred cathodes contain about 1 part electrolyte and 3 parts carbon for each 10 parts of depolarizer.

The electrolyte is a salt that has a substantially ionically non-conductive B-phase at normal ambient temperatures and undergoes a solid state phase transition to an ionically conductive a-phase when heated above a phase transition temperature. Among a number of such salts that are known and are suitable for use, silver iodide (AgI) is preferred as it has a moderate phase transition temperature (145° C.) and can be used over a wide temperature range, up to about 550° C., without melting or decomposing. Other illustrative electrolytes having the phase transition temperatures indicated include cuprous bromide (CuBr—470° C.), a cuprous iode (CuI—402° C.), cuprous mercuric iodide (Cu$_2$HgI$_4$—65° C.) and silver mercuric iodide (Ag$_2$HgI$_4$—50° C.). Potassium cuprous iodide (KCu$_4$I$_5$) is also suitable below 257° C.; above this temperature it disproportionates to potassium iodide and cuprous iodide, neither of which is highly conductive. The electrolyte may be a pellet compacted from powdered electrolyte or, in the case of meltable electrolytes such as silver iodide, it may be a solidified film of molten salt.

The heating means of the battery provides sufficient heat to raise and maintain for the desired time the temperature of the battery above phase transition temperature of the electrolyte and below the temperature at which any of the cell components melt or decompose. The heating means may be an exothermically reactive combustible charge, although other heating means may be used. It is preferred to arrange the cells and combustible charge in heat transfer relationship within a hermetically sealed container provided with conventional means, such as a percussion primer or electric squib, for igniting the combustible charge. A wide variety of combustible compositions that undergo exothermic reaction without the liberation of any substantial amount of gas are well known and are generally suitable for use in this invention. In general, they comprise an oxidizable substance and an oxidizing agent, with or without inert diluent to modify the rate of combustion reaction. We generally prefer compositions using one or more finely divided metals having a high heat of combustion as the oxidizable component and as the oxidizing agent any of a variety of inorganic oxidizers, such as, for example, chlorate, perchlorates, and nitrates, particularly of the alkali metals, as well as chromates, and oxides of metals less electropositive than the oxidizable metal component. The particular composition will, of course, depend on the heat requirements of the particular battery in which it is used. The following compositions, by way of illustration, have been found satisfactory for the purposes of this invention: zirconium powder and powdered ferric oxide in stoichiometric proportions (43.5% Zr, 51.5% Fe$_2$O$_3$) with 5% by weight diatomaceous earth diluent; 22% nickel powder, 5% zirconium powder, 16.8% potassium perchlorate (KClO$_4$) and 56.2% barium chromate; 9.6% aluminum and the balance barium chromate; 31–39% nickel powder, 18–23% potassium chlorate and 37–50% diatomaceous earth.

The following examples are illustrative of the batteries of this invention:

EXAMPLE 1

Layered pellet cells were made using various anode, electrolyte and cathode materials by layering anode powder, electrolyte powder and cathode powder in a die and compacting the material into a coherent single pellet having an anode, electrolyte and cathode layer. Peak short circuit currents of single cell batteries incorporating the cells were measured at room temperature and at an operating temperature of about 250° C. The results are shown in Table 1 for batteries having an electrode area of 5.06 sq. cm.

TABLE 1

| Anode [1] | Electrolyte | Cathode [2] | Short circuit current (ma.) Room temp. | Short circuit current (ma.) 250° C. |
|---|---|---|---|---|
| Ag | AgI | WO$_3$ | 0 | 3 |
| Ag | AgI | K$_2$CrO$_4$ | 0 | [3] 1 |
| Ag | AgI | V$_2$O$_5$ | 0.08 | 7 |
| Ag | AgI | MnO$_2$ | 0.3 | 200 |
| Ag | AgI | I$_2$O$_5$ | 0.2 | 155 |
| Ag | NH$_4$Ag$_4$I$_5$ | V$_2$O$_5$ | 4 | [4] 80 |
| Mg | AgI | V$_2$O$_5$ | 0.09 | 8 |

[1] 1 part AgI to 1 part of metal.
[2] 1 part AgI to 3 parts carbon to 10 parts of designated depolarizer.
[3] At 400° C.
[4] At 200° C.

EXAMPLE 2

Voltage-current relationships at various operating temperatures were determined for single layered cell batteries as in Example 1 having an Ag—AgI electrolyte and an I$_2$O$_5$—C—AgI cathode. Higher power outputs are obtained with increasing temperatures, as shown in Table 2 for cells having a 5.06 sq. cm. electrode area.

TABLE 2

| | Voltage (volts) | | | | Short circuit current (ma.) |
|---|---|---|---|---|---|
| | Open circuit | At 80 ma. | At 100 ma. | At 140 ma. | |
| Temperature (° C.): | | | | | |
| 200 | 0.6 | 0.57 | 0.37 | | |
| 220 | 0.6 | 0.59 | 0.58 | | 114 |
| 240 | 0.6 | 0.59 | 0.58 | | 136 |
| 270 | 0.6 | 0.59 | 0.58 | 0.54 | 166 |

EXAMPLE 3

A single cell battery, as in Example 2, was activated by heating and discharged at a constant current drain of 10 ma./sq. cm. Cell voltage decreased from 0.6 volt to 0.52 volt after 35 minutes of discharge and the battery was expended after 39 minutes.

EXAMPLE 4

Silver iodide was sprinkled on silver foil, heated to melting and then cooled to form an anode-electrolyte laminate with a 0.004-inch silver layer and an adherent 0.003-inch layer of silver iodide. A cathode was formed by pressing at 6 tons pressure a ⅝-inch diameter pellet about 0.004–0.007 inches thick from a mixture of 10 parts bismuth triiodide, 3 parts carbon and 1 part silver iodide. The cathode pellet was pressed into the silver iodide layer at 350° C. for 15 seconds under 35 p.s.i.g. pressure. At 350° C., under a load of 100 ma., the cell voltage was about 0.25 volt over a nine minute cell life.

EXAMPLE 5

A battery having ten series connected Ag/AgI/BiI$_3$ cells as described in the preceding example, each cell being 1⅜ inches in diameter and having a ¼-inch center hole, contained sufficient heating composition to provide 96.5 calories per gram of cell weight. With a 500 ma. load, the battery voltage, after an initial high voltage of about 4 volts when the combustible charge was ignited, decreased from 2.6 volts to 1.4 volts over nine minutes.

The cell was instantaneously short circuited at intervals during the test and the short circuit current was measured to be 13 amps at 30 seconds, 10 amps at 3 minutes and 6.8 amps at 6 minutes.

We claim:

1. A primary battery comprising a sealed housing containing a solid state thermally activated primary cell having an anode selected from the group consisting of silver and copper, a bismuth triiodide depolarizer cathode spaced from said anode, a solid state electrolyte disposed between said electrodes and in contact therewith, said electrolyte being selected from the group consisting of silver iodide, cuprous bromide, cuprous iodide, cuprous mercuric iodide, silver mercuric iodide and potassium cuprous iodide, a combustible charge that burns without production of any substantial amount of gas within said housing and in heat transfer relationship with said cell, and means to ignite said charge, whereby heat generated by the combustible charge will raise the temperature of the cell above the phase transition temperature of the electrolyte.

2. A battery according to claim 1 in having a silver anode and a silver iodide electrolyte.

3. A battery according to claim 2, said cathode consisting essentially of an intimate mixture of bismuth triiodide, carbon and silver iodide.

References Cited

UNITED STATES PATENTS

| | | | |
|---|---|---|---|
| 3,117,035 | 1/1964 | Mrgudich | 136—90 |
| 2,894,052 | 7/1959 | Evans | 136—83 R |
| 3,443,997 | 5/1969 | Argue et al | 136—83 R |
| 3,503,810 | 3/1970 | Groce | 136—83 R |
| 3,463,670 | 8/1969 | Rao et al. | 136—83 R |
| 3,554,807 | 1/1971 | Kellner | 136—83 T |
| 3,513,027 | 5/1970 | Liang et al. | 136—83 R |
| 3,067,465 | 12/1962 | Giardini et al. | 136—83 R |
| 3,558,357 | 1/1971 | Takahashi et al. | 136—83 T |

HARVEY E. BEHREND, Primary Examiner

U.S. Cl. X.R.

136—83 T, 137